United States Patent [19]

Gilliam

[11] Patent Number: 4,937,750

[45] Date of Patent: Jun. 26, 1990

[54] ELECTRONIC CONTROL FOR VEHICLE FOUR WHEEL DRIVE SYSTEM

[75] Inventor: Bradley T. Gilliam, Laurinburg, N.C.

[73] Assignee: Dana Corporation, Toledo, Ohio

[21] Appl. No.: 137,394

[22] Filed: Dec. 23, 1987

[51] Int. Cl.$^5$ .............................................. B60K 17/34
[52] U.S. Cl. ............................. 364/424.1; 364/426.03; 180/248; 180/249; 192/103 F
[58] Field of Search ........... 364/424.01, 424.1, 426.03, 364/426.02; 180/248, 249; 192/103 F; 74/866

[56] References Cited

U.S. PATENT DOCUMENTS

| | | | |
|---|---|---|---|
| 4,298,085 | 11/1981 | Morota et al. | 180/247 |
| 4,320,813 | 3/1982 | Manna | 180/249 |
| 4,417,641 | 11/1983 | Kageyama | 157/1.25 |
| 4,433,748 | 2/1984 | Satoh et al. | 180/247 |
| 4,466,502 | 8/1984 | Sakai | 180/247 |
| 4,467,886 | 8/1984 | DeClaire et al. | 180/197 |
| 4,470,489 | 9/1984 | Makita | 192/3.58 |
| 4,484,653 | 11/1984 | Horikoshi et al. | 180/233 |
| 4,499,450 | 2/1985 | Makita | 340/52 R |
| 4,511,014 | 4/1985 | Makita | 180/233 |
| 4,538,700 | 9/1985 | Suzuki | 180/248 |
| 4,552,241 | 11/1985 | Suzuki | 180/249 |
| 4,556,134 | 12/1985 | Takano | 192/103 F |
| 4,558,414 | 12/1985 | Sakakiyama | 364/424.1 |
| 4,560,025 | 12/1985 | Suzuki et al. | 180/247 |
| 4,562,541 | 12/1985 | Sakakiyama | 364/424.1 |
| 4,566,554 | 1/1986 | Suzuki | 180/249 |
| 4,576,061 | 3/1986 | Yamakawa et al. | 74/665 T |
| 4,582,159 | 4/1986 | Suzuki | 180/247 |
| 4,586,583 | 5/1986 | Yamakawa et al. | 180/247 |
| 4,609,064 | 9/1986 | Suzuki et al. | 180/233 |
| 4,613,008 | 9/1986 | Hiraiwa et al. | 180/247 |
| 4,630,704 | 12/1986 | Yamakawa et al. | 180/247 |
| 4,702,341 | 10/1987 | Taga et al. | 364/424.1 |
| 4,715,466 | 12/1987 | Ishii et al. | 364/424.1 |
| 4,754,834 | 7/1988 | Ozaki et al. | 364/424.1 |
| 4,754,835 | 7/1988 | Stelter et al. | 180/248 |
| 4,757,870 | 7/1988 | Torii et al. | 364/424.1 |
| 4,765,434 | 8/1988 | Kawamoto et al. | 180/249 |
| 4,776,421 | 10/1988 | Kashihara | 180/249 |

*Primary Examiner*—Parshotam S. Lall
*Assistant Examiner*—Christopher L. Makay
*Attorney, Agent, or Firm*—MacMillan, Sobanski & Todd

[57] ABSTRACT

A microcomputer-based electronic control system for a full time four wheel drive torque transfer case monitors the relative slip between the front and rear output shafts of the transfer case, and generates a signal to engage an electromagnetic clutch for a predetermined time period in the event a predetermined slip threshold is exceeded. Below a predetermined vehicle road speed, the electronic control utilizes a pulse counting technique to determine whether or not an excessive slip condition occurs. Above the predetermined speed, the control compares the front and rear output shafts speeds to determine whether there is excessive slippage. During the first portion of the clutch engagement period, the clutch is fully engaged while, during the last portion, a partial clutch engagement signal is generated to cause the clutch to gradually move from a fully engaged condition to a fully disengaged condition. The length of time the clutch is engaged can be a function of the vehicle road speed. The slip threshold can also be a function of the vehicle road speed, and can vary depending on whether the front or rear output shaft is rotating faster. The electronic control compares the output shaft speeds after the clutch is engaged to check the mechanical condition of the clutch. Also, in the event the microcomputer fails to discontinue the generation of the clutch engagement signal, a failsafe time out circuit will automatically turn off the clutch.

27 Claims, 5 Drawing Sheets

ELECTRONIC CONTROL FOR VEHICLE FOUR WHEEL DRIVE SYSTEM

BACKGROUND OF THE INVENTION

The present invention relates generally to an electronic control for a vehicle four wheel drive system and, in particular, to an electronic control which includes means for detecting a predetermined slip (speed differential) between the front and rear wheels of the vehicle, and means for selectively engaging a clutch during excessive slip conditions to prevent relative slip between the front and rear wheels.

Four wheel drive systems for vehicles are becoming increasingly common. In the past, such systems typically included torque transfer case having an input shaft connected to the output of the vehicle driver for selecting front and rear output shafts connected to the front and rear differentials of the vehicle for driving the front and rear wheels respectively. Typically, such systems were provided with selective control means operable by the vehicle driver for selecting whether the vehicle is to be operated in either a two wheel or a four wheel drive mode. When operated in the four wheel drive mode, these systems did not provide for any speed differentiation between the front and rear wheels such that, on dry pavement, "hopping" of the front wheels would occur during turning of the vehicle, due to the normal overspinning of the front wheels. Consequently, it was recommended that the four wheel mode be used only during wet, icy, or low traction road surface conditions.

Recently, certain vehicles have been provided with a "full time" four wheel drive system. In these systems, the torque transfer cases are typically provided with an interaxle differential for dividing torque between the vehicle front and rear differentials. The interaxle differential enables the front and rear wheels to rotate at different speeds, which occurs during turning of the vehicle, or in the event the front and rear wheels have different diameter tires. Also, in order to prevent excessive slipping between the front and rear wheels, these transfer cases typically include a selectively engageable clutch means which is operative to lock the interaxle differential upon sensing a predetermined slippage between the front and rear output shafts of the transfer case.

SUMMARY OF THE INVENTION

The present invention concerns a microcomputer-based electronic control system for automatically controlling a full-time four wheel drive torque transfer case. The transfer case includes an input shaft coupled to the output of the vehicle transmission, and an interaxle planetary gear differential for dividing torque between a rear output shaft connected to the vehicle rear differential and a front output shaft connected to the vehicle front differential. An electromagnetic clutch is located in the transfer case and is adapted to selectively lock the planetary gear differential to prevent relative slip between the front and rear output shafts. In accordance with the present invention, the electronic control utilizes a pair of Hall effect sensors for monitoring the speed of the front and rear output shafts. When a predetermined amount of slip is detected between the front and rear output shafts, the electronic control is operative to selectively engage the electromagnetic clutch for a predetermined time period. During this predetermined time period, the clutch is engaged to lock the differential and prevent slip between the front and rear output shafts.

The electronic control of the present invention includes several unique operating features. For example, the control utilizes a unique approach to determine whether a slip condition has occurred when the road speed of the vehicle is below a predetermined amount. In these instances, the control separately counts the pulses from each speed sensor, and stops counting when a first predetermined number of pulses has been counted for at least one of the sensors. At this time, the control checks to see whether the difference between the number of front and rear output pulses has exceeded a second predetermined amount. If so, the clutch is engaged for the predetermined time period. During the first portion of this time period, the clutch is fully engaged while, during the last portion, a partial clutch engagement signal is generated to cause the clutch to gradually move from a fully engaged condition to a fully disengaged condition. Also, if desired, the length of the predetermined time period the clutch is engaged can be a function of vehicle road speed. Typically, the time period decreases with increasing road speed.

When the vehicle road speed is above the predetermined amount, the control compares the front and rear output shaft speeds to determine whether there is excessive slippage. The present control utilizes a unique method of alternately determining front and rear output shaft speeds. In particular, the time between successive speed sensor pulses is measured and averaged over a predetermined number of cycles. The predetermined number of cycles increases with increasing road speed, which is determined based on the time for the first cycle.

Since the minimum turning radius of a vehicle increases with increasing road speed, a larger slip threshold is required at lower vehicle speeds. In the present invention, the slip threshold required to engage the clutch is decreased with increasing vehicle speed. In the preferred embodiment, the control stores a plurality of slip thresholds, with each slip threshold corresponding to a predetermined range of vehicle road speed.

In addition to varying the slip threshold as a function of vehicle road speed, the present control also varies the slip threshold as a function of whether the front or rear output shaft is rotating faster. Since turning of the vehicle causes the front wheels to rotate at a greater speed than the rear wheels, it has been found that larger slip thresholds are required if the front output shaft is rotating faster than the rear output shaft. Thus, in the present invention, depending on whether the front or rear output shaft is rotating faster, the speed difference is compared with separate slip reference values.

The electronic control of the present invention includes several unique diagnostic and failsafe features. For example, as mentioned above, upon determining that the clutch should be engaged, the microcomputer is operative to generate a clutch engagement signal for a predetermined time period. In the event the microcomputer fails to discontinue the generation of the clutch engagement signal at the end of this time period, a failsafe time out circuit, which is external to the microcomputer, will automatically turn off the clutch. Also, in order to ensure that the clutch is operating properly, the control will compare the front and rear output shaft speeds after the clutch has been engaged for a certain time period, to make sure there is no slip between the shafts.

The above, as well as other advantages of the present invention, will become readily apparent to one skilled in the art from reading the following detailed description in conjunction with the attached drawings.

DESCRIPTION OF THE PREFERRED EMBODIMENT

Figure 1:
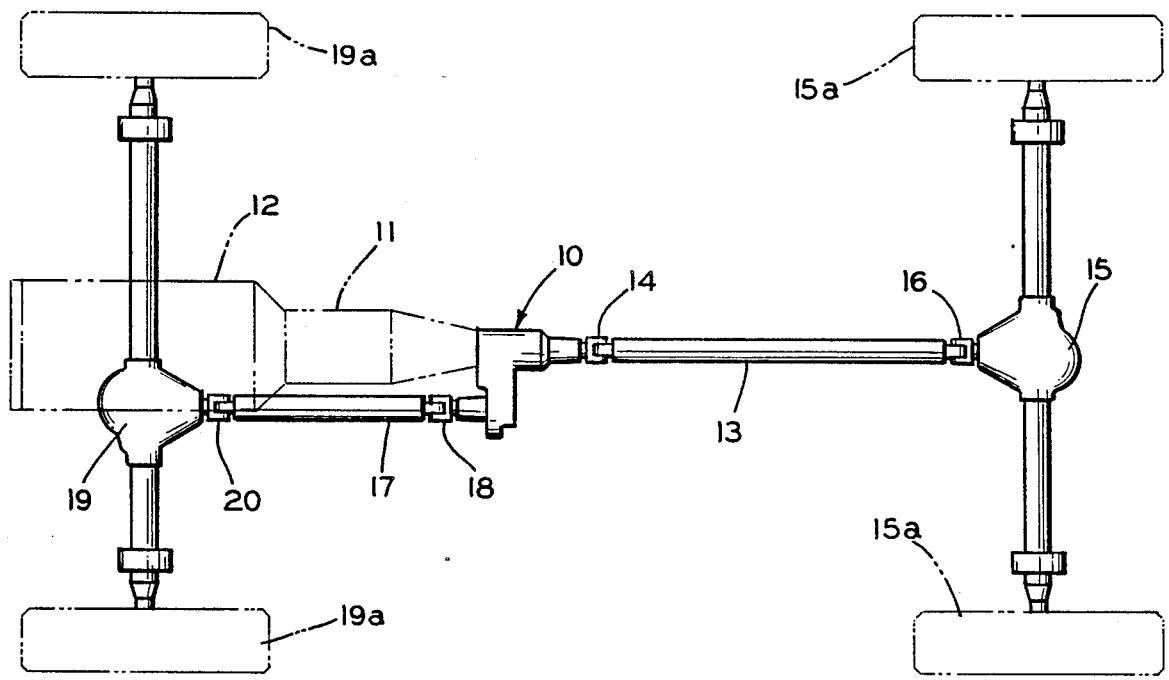
FIG. 1 is a top plan view of a four wheel drive system having a torque transfer case which can be controlled with the electronic control of the present invention.

Referring first to FIG. 1, there is shown a vehicle four wheel drive system which utilizes a torque transfer case 10 which can be controlled by the electronic control of the present invention. The transfer case 10 is secured to the rear of a transmission unit 11 (shown in phantom) which in turn is coupled to a drive engine 12 (also in phantom). The transmission 11 is provided with an output shaft which is coupled to an input shaft of the transfer case 10. The transfer case 10 includes a rear output shaft connected to the front end of a rear drive shaft 13 by means of a conventional universal joint coupling 14. The rear end of the drive shaft 13 is coupled to an input shaft of a rear differential 15 by means of a universal joint coupling 16. The rear differential 15 is adapted to divide torque from the drive shaft 13 between the rear wheels 15a.

The transfer case 10 is provided with a front output shaft which is connected to the rear end of a front drive shaft 17 by means of a universal joint coupling 18. The front drive shaft 17 has a front end connected to an input shaft of a front differential 19 by means of a universal joint coupling 20. The front differential is adapted to divide torque received from the drive shaft 17 between the vehicle front wheels 19a.

Figure 2:
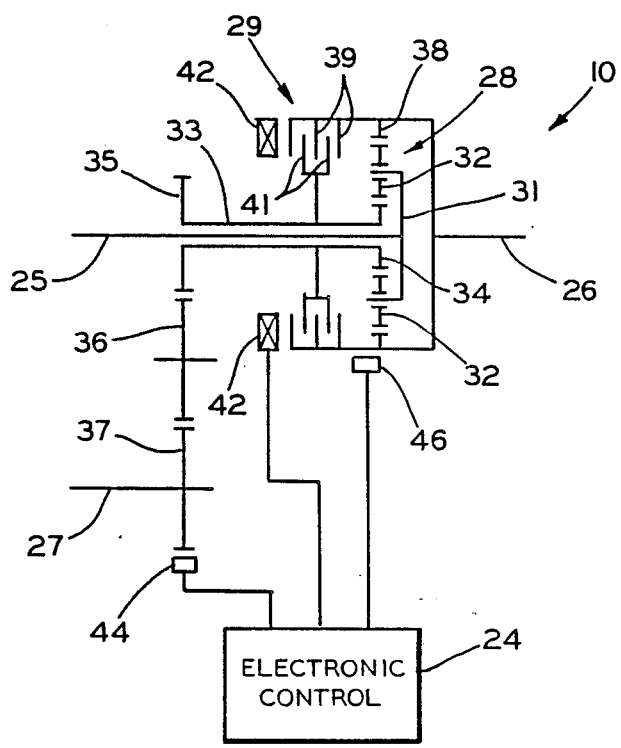
FIG. 2 is a schematic view illustrating the internal components of a transfer case which can utilize the electronic control of the present invention.

Referring now to FIG. 2, the internal components of the transfer case 10 are schematically shown, along with certain electrical connections to an electronic control which is represented in FIG. 2 as a block 24. As shown in FIG. 2, the transfer case 10 includes an input shaft 25 coupled to the output shaft of the vehicle transmission 11 (shown in FIG. 1). The transfer case 10 also includes a rear output shaft 26 adapted to be connected to the rear drive shaft 13, and a front output shaft 27 for connection to the front drive shaft 17. The transfer case utilizes an interaxle planetary gear differential, generally indicated by the reference numeral 28, for dividing torque between the rear output shaft 26 and the front output shaft 27. Also, an electromagnetic friction clutch, generally represented by the reference numeral 29, is provided for selectively locking the planetary gear differential to prevent any slip between the front and rear output shafts.

In particular, the input shaft 25 is secured to a planet carrier 31 which carries a plurality of circumferentially spaced and individually rotatable planet gears 32. A sleeve member 33 is rotatably mounted about the input shaft 25 and has one end which carries a sun gear 34 of the planetary gear differential 28 and an opposite end which carries a first output gear 35. The first output gear is connected to drive a second intermediate output gear 36 which in turn drives a third output gear 37 secured to the front output shaft 27. A ring gear 38 of the planetary gear differential 28 is secured to the rear output shaft 26.

The electromagnetic clutch assembly 29 includes a first group of clutch plates 39 which are secured for rotation with the ring gear 38, and a second group of clutch plates 41 which are secured to the sleeve member 33 for rotation with the sun gear 34. An annular clutch coil 42 is positioned adjacent the clutch plates 39 and 41 and is adapted to receive a clutch engagement signal on a line 43 from the electronic control 24. The electromagnetic clutch 29 has a construction wherein, when a clutch engagement signal is generated to energize the coil 42, the magnetic field generated by the energized coil 42 exerts a magnetic force to urge the clutch plates 39 and 41 into frictional engagement with one another to prevent relative rotation therebetween, thus locking the sun gear 34 and the ring gear 38 together. This prevents any relative slip between the front and rear output shafts.

The speed of the front output shaft is monitored by a speed sensor 44 which can be positioned adjacent the periphery of the teeth of the front output gear 37. The speed sensor 44 generates a front output shaft speed signal to the electronic control 24. Similarly, the speed of the rear output shaft 26 is monitored by a speed sensor 46 which can be positioned adjacent the periphery of the ring gear 38, and can be adapted to sense a plurality of circumferential speed external teeth provided about the periphery of the ring gear. The speed sensor 46 generates a rear output shaft speed signal to the electronic control 24.

As previously mentioned, the planetary gear differential 28 is provided for dividing torque between the rear output shaft 26 and the front output shaft 27. Normally, the clutch coil 42 is not energized such that a predetermined slippage can occur between the front and rear output shafts to accommodate slightly different front and rear wheel speeds which occur during normal traction conditions such as when turning the vehicle. However, as will be discussed in more detail below, when slippage between the front and rear wheels exceeds a predetermined amount, the electronic control 24 will generate a clutch engagement signal which causes the planetary gear differential to lock and provide a direct drive connection between the input shaft 25 and the front and rear output shafts 26 and 27. In particular, when the clutch coil 42 is energized, the ring gear 38 is locked relative to the sun gear 34 to prevent relative rotation therebetween. When the ring gear 38 is locked relative to the sun gear 32, the planet gears 32 are prevented from rotating about their associated shafts, thereby preventing rotation of the planet carrier 31 relative to either the ring gear 38 or the sun gear 34.

It should be noted that the transfer case illustrated in FIG. 2 is only one example of a transfer case which can utilize the electronic control of the present invention, and that other transfer cases which use a selectively engageable clutch means can be operated by the electronic control 24.

Figure 3:
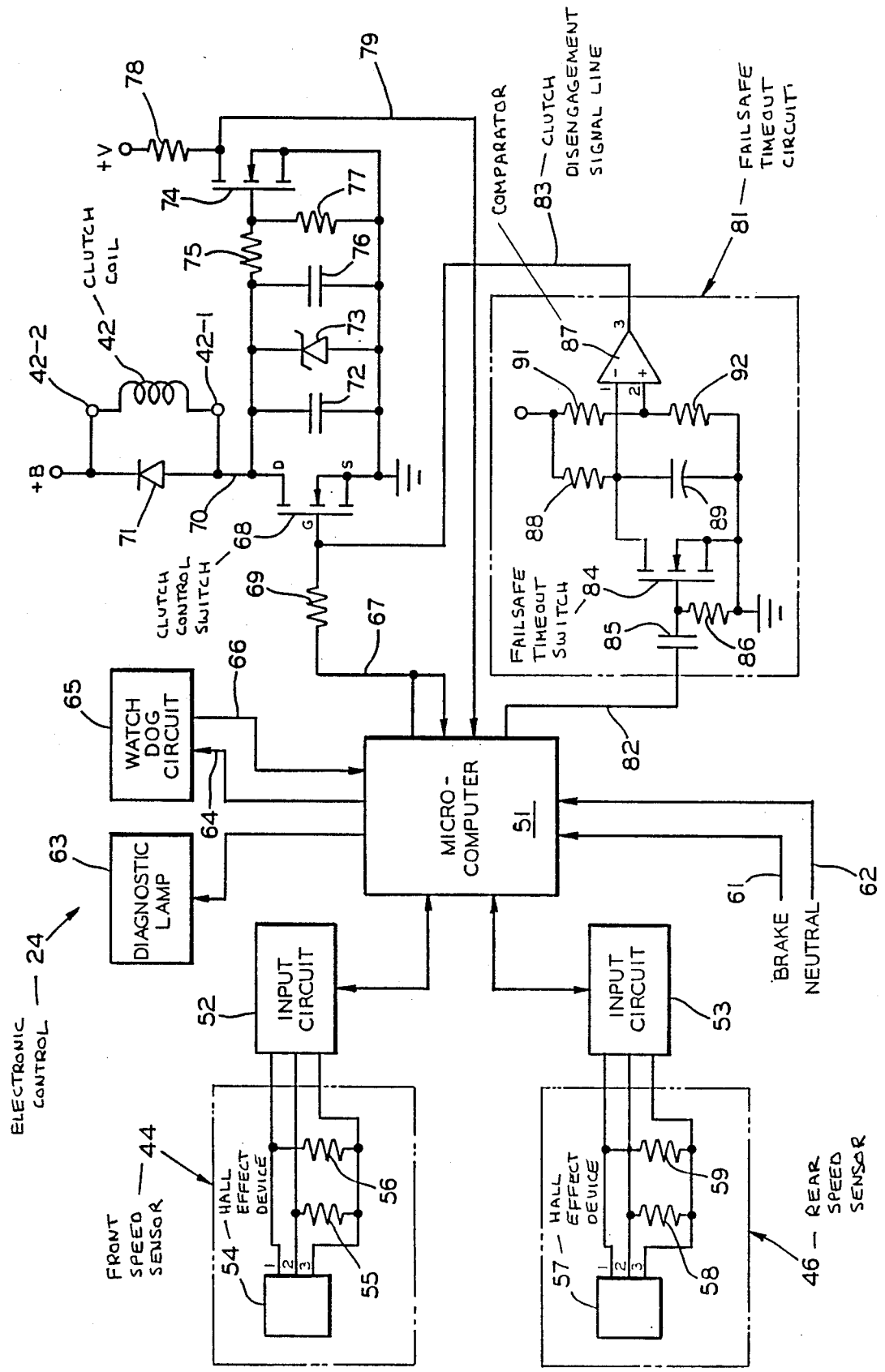
FIG. 3 is a circuit schematic illustrating the control of the present invention.

Referring now to FIG. 3, there is shown an electrical schematic diagram of the electronic control 24 of FIG.

2. The electronic control 24 is connected to receive output signal from the front speed sensor 44 and the rear speed sensor 46. Further, the control 24 is connected to generate a clutch engagement signal to the clutch energizing coil 42.

The electronic control 24 is centered around a microcomputer 51. The front speed sensor 44 is connected to the microcomputer 51 through an input circuit 52 which conditions the output signal from the sensor 44 prior to supplying the signal to the microcomputer 51. Similarly, the rear speed sensor 46 is connected to the microcomputer 51 through an input conditioning circuit 53. While various types of commercially available speed sensors could be used with the present invention, it has been found that it is preferable to use a Hall effect device as the speed sensing unit. The Hall effect device functions as a digital switch and provides an output signal which alternates between a high and low logic level as the associated gear teeth or other actuating teeth cause the magnetic field through the switch to vary as the associated component rotates. While a conventional variable reluctance speed sensor could be utilized, it has been found that this type of sensor requires extra input conditioning circuitry and does not provide a clean, square wave form at low shaft speeds which is desirable with the present invention.

As shown in FIG. 3, the front speed sensor 44 includes a Hall effect device 54 having output terminals 54-1, 54-2 and 54-3, all of which are connected to the input circuit 52. Typically, the terminal 54-1 is connected to a regulated power supply source of a predetermined magnitude, while the terminal 54-3 is connected to the circuit ground potential. The output signal of the Hall effect device is generated at the terminal 54-2. In accordance with the present invention, a pair of internal resistors 55 and 56 are included in the speed sensor 44 and are connected across selected output terminals of the Hall effect device 54. In particular, the resistor 55 is connected between the terminals 54-2 and 54-3, while the resistor 56 is connected between the terminals 54-1 and 54-3. Thus, the entire sensor 44, including the Hall effect device 54, and the resistors 55 and 56, are located in the transfer case adjacent the periphery of the front output gear 37, as shown in FIG. 2.

Generally, the electronic control 24 is located within a separate housing which is external to the transfer case housing. For example, the electronic control can either be attached to an exterior portion of the transfer case or it can be located at another location on the vehicle. By incorporating the resistors 54 and 55 in the sensor 44, the microcomputer can generate signals to the input circuit 52 which enable the condition of the wiring up to the sensor to be checked. Otherwise, without the resistors 55 and 56, the diagnostic routine of the microcomputer 51 would not be able to distinguish between a fault in the sensor unit 44, or the wiring between the sensor 44 and the electronic control 24.

The rear speed sensor 46 has a construction similar to that of the front speed sensor 44. In particular, the rear speed sensor 46 includes a Hall effect device 57 having output terminals 57-1, 57-2 and 57-3 connected to the input circuit 53. Also, an internal resistor 58 is connected between the terminal 57-2 and 57-3, while a second internal resistor 59 is connected between the terminals 57-1 and 57-3.

The microcomputer 51 is connected to receive a brake signal on a line 61 and a neutral signal on a line 62.

The brake signal is supplied to the microcomputer on the line 61 at a predetermined logic level whenever the vehicle brake pedal has been depressed by the operator. Also, whenever the transmission of the vehicle is in a neutral or parked position, a logic level signal at a predetermined level is supplied on the line 62 to the microcomputer. As will be discussed, whenever the vehicle is in a braking condition, or the transmission is in neutral or park, the clutch engagement portion of the control is disabled such that the clutch remains disengaged under these conditions.

The microcomputer 51 is connected to a diagnostic lamp 63. The diagnostic lamp 63 is provided to enable the microcomputer to flash certain codes representative of a particular operating condition or a particular circuit problem which has been detected by its diagnostic routine. The microcomputer 51 is also connected to generate a pulsed output signal at a predetermined frequency on a line 64 to a watchdog circuit 65. As long as the microcomputer generates the pulsed output signal, the watch dog circuit 65 will remain inactive. In the event the microcomputer discontinues generating the pulsed output signal, this is an indication that a problem in the computer program has occurred. In these instances, the watch dog circuit will generate a reset pulse on a line 66 in order to reset the microcomputer.

The microcomputer 51 is connected to generate a clutch engagement signal on a line 67. The line 67 is connected to the gate of a transistor 68 through a resistor 69. The source of the transistor 68 is connected to the circuit ground potential, while the drain of the transistor is connected to a terminal 42-1 of the clutch coil 42 by a line 70. The other terminal 42-2 of the coil 42 is connected to the vehicle +B power supply. Normally, the transistor 68 is maintained in an off state by generating an low level signal near ground potential on the line 67. When the transistor is off, the current flow through the clutch coil is sufficiently low such that the clutch is in its disengaged position. When a high level signal is generated on the line 67, the transistor 68 is turned on to place the clutch terminal 42-1 near ground potential, and enable sufficient current flow through the clutch coil 42 to thereby engage the clutch.

A diode 71, a capacitor 72, and a zener diode 73 are provided to protect the transistor 68 from voltage spikes and current surges which can occur when the transistor 68 is turned on and off. In particular, the diode 71 has an anode connected to the clutch coil terminal 42-1 and a cathode connected to the clutch coil terminal 42-2. The capacitor 72 is connected between the line 70 and the circuit ground potential, while the zener diode 73 has an anode connected to the circuit ground potential and a cathode connected to the line 70.

A transistor 74 is responsive to the level of the signal on the line 70. In particular, a resistor 75 is connected between the gate of the transistor 74 and the line 70. A filter capacitor 76 is connected between the line 70 and the circuit ground potential, while a biasing resistor 77 is connected between the gate of the transistor 74 and the circuit ground potential. The drain of the transistor 74 is connected to a regulated +V power supply through a resistor 78, while the source of the transistor 74 is connected to the circuit ground potential.

The level of the signal at the drain of the transistor 74 is supplied to the microcomputer 51 on a line 79. In operation, the transistor 74 provides a means of checking the continuity of the clutch coil 42. When the microcomputer is generating a low level signal on the line 67 such that the transistor 68 is off, the clutch is disengaged, and the line 70 will be at or near the +B voltage potential, providing that there is circuit continuity through the clutch coil 42. When the line 70 is at the +B potential, the high level signal supplied to the gate of the transistor 54 will turn on the transistor 74 to place the line 79 near the circuit ground potential. In the event there is discontinuity in the clutch coil 42, the level of the signal on the line 70 will not be sufficient to turn on the transistor 74, such that the line 79 will be at or near the +V potential. Thus, by monitoring the level of the signal on the line 79 prior to engaging the clutch, the microcomputer can determine whether there is continuity through the clutch coil.

The circuit of the present invention incorporates a failsafe timeout circuit, generally represented in FIG. 3 by the reference numeral 81. In particular, the timeout circuit is adapted to receive a reset signal on a line 82 from the microcomputer 51, and is connected to generate a clutch disengagement signal on a line 83 which is connected to the gate of the transistor 68. The timeout circuit 81 includes a transistor 84 having a gate connected to the line 82 through a filter capacitor 85. A resistor 86 is connected between the gate of the transistor 84 and the circuit ground potential. The drain of the transistor 84 is connected to the inverting input 87-1 of a comparator 87. An RC time constant circuit consisting of a resistor 88 and a capacitor 89 is connected between the +V power supply and the circuit ground potential. The junction between the resistor 88 and the capacitor 89 is connected to the inverting input of the comparator 87. A voltage divider, consisting of a resistor 91 and a second resistor 92 is connected between the +V power supply and the circuit ground potential. The junction between the resistors 91 and 92 is connected to the non-inverting input 87-2 of the comparator 87. The output of the comparator 87-3 is connected to the line 83.

Normally, prior to generating the clutch engagement signal, the microcomputer 51 will generate a reset signal on the line 82 which will temporarily turn on the transistor 84. When the transistor 84 is turned on, the capacitor 89 is discharged such that the inverting input 87-1 of the comparator 87 is at or near the circuit ground potential. At this time, the non-inverting input 87-2 will be at a voltage level as determined by the values of the resistors 91 and 92. After the reset pulse 82 is removed, the capacitor 89 will begin to charge through the resistor 88, with the rate of increase in voltage across the capacitor being determined by the values of the resistor 88 and capacitor 89. As long as the voltage level at the inverting input 87-1 is below the level of the voltage at the non-inverting input 87-2, the output of the comparator 87 remains open and does not affect the operation of the transistor 68. Thus, the transistor 68 will either be in an off state or an on state as determined by the level of the signal on the line 83.

As will be discussed, normally when the clutch is engaged, the clutch engagement signal on the line 67 is generated for a predetermined time period. The failsafe timeout circuit 81 is provided to ensure that, in the event there is a problem with the microcomputer control and the clutch engagement signal on the line 67 is not discontinued after the predetermined time period, the clutch will be automatically disengaged after a predetermined failsafe timeout period which can be, for example, approximately two to three times the time period over which the clutch engagement signal is normally generated. As previously mentioned, the values of the resistors 88 and the capacitor 89 are chosen to provide the desired failsafe timeout period. When the capacitor 89 has charged to a voltage level above the level of the comparator input 87-2, the comparator will generate a low level signal on the line 83 to the gate of the transistor 68, thereby turning the transistor 68 off and disengaging the clutch, regardless of the level of the signal on the line 67.

Figure 4A:
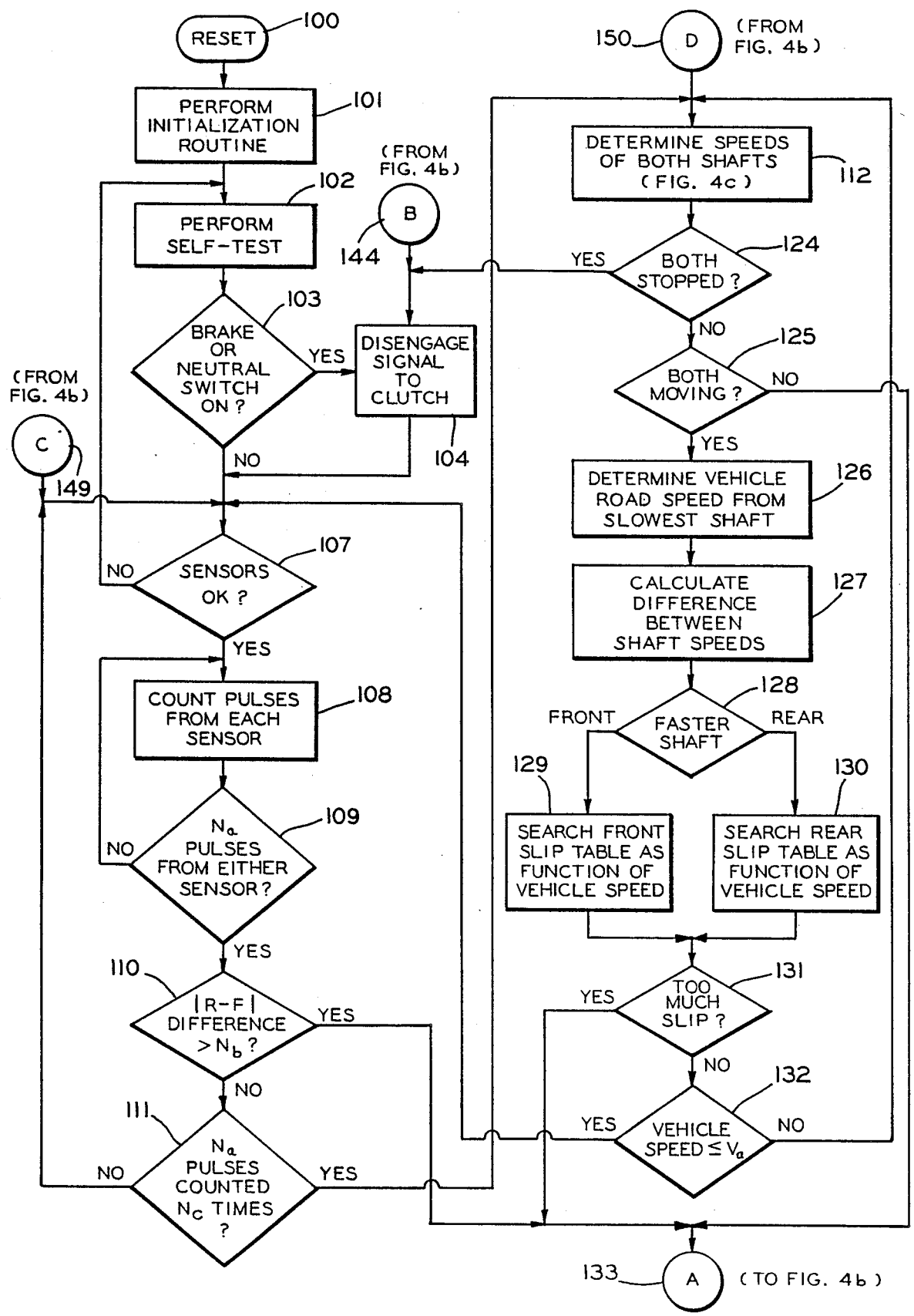
FIGS. 4a through 4c are flow diagrams which illustrate the operation of the electronic control of the present invention in automatically controlling the transfer case of FIG. 2.
Figure 4B:
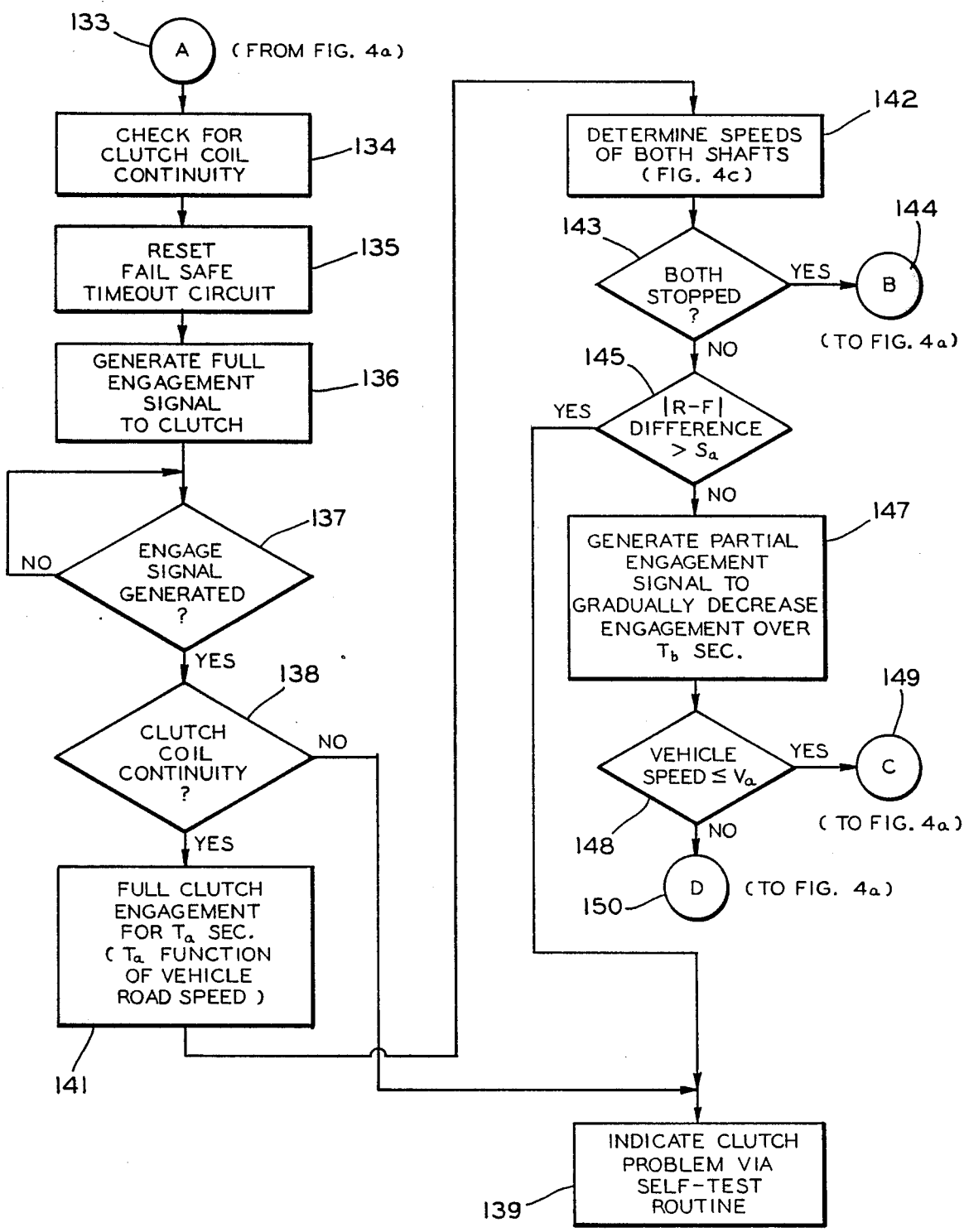
Figure 4C:
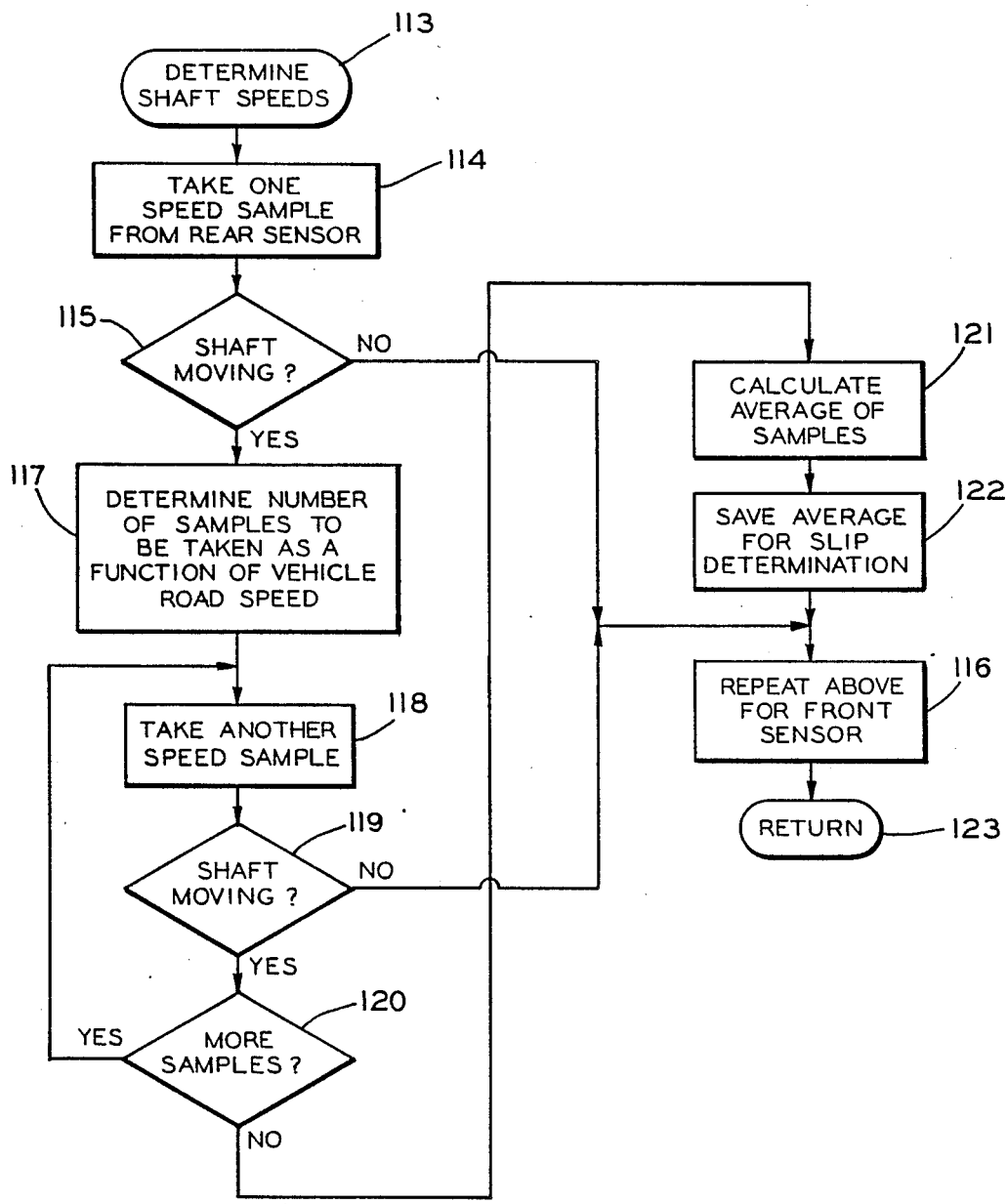

Referring now to FIGS. 4a through 4c, there is shown flow diagrams which will be utilized to explain the operation of the electronic control. Referring first to FIG. 4, the operation of the control is initiated at an oval 100 labeled "RESET" and then enters a processing function 101 wherein the microcomputer performs an initialization routine during which ports are initialized, and the watch dog timer can be toggled. Next, the program enters a processing function 102 wherein a self-test routine is performed. During the self-test, the microcomputer can check the microcomputer memory, and perform continuity checks of the clutch coil 42, the front speed sensor 44, and the rear speed sensor 46. In the event any problems are located, the microcomputer can inform the operator or the service technician by flashing a predetermined code on the diagnostic lamp 63.

After the self-test is completed, the program enters a decision point 103 wherein the level of the signals on the lines 61 and 62 are checked to determine whether or not the vehicle brake pedal is depressed, or the transmission is in a neutral position or parked. If either of these are true, the program branches at YES and enters a processing function 104 to generate a disengage signal to the clutch coil 42, prior to entering a decision point 107. It should be noted that the presence of either a brake or neutral signal on the lines 61 or 62 immediately interrupts the program and causes the program to enter the decision point 103 from which the clutch is disengaged. In the event the vehicle is not braking or is not in a neutral or parked position, the program branches from the decision point 103 at NO and enters the decision point 107 to check the condition of the speed sensors 44 and 46. If a problem is located with the speed sensors, the program branches at NO and returns to the processing function 102 wherein a self-test is performed to detect the particular problem.

If the sensors are operating properly, the program branches from the decision point 107 at YES and enters a processing function at 108 wherein the initial operations are performed to detect whether a slip condition has occurred between the front and rear output shafts. More specifically, in the processing function 108, the program begins to count the initial pulses generated by each speed sensor. It should be noted that since the speed sensors are Hall effect digital switches, the computer can be adapted to sense either the leading or trailing edge of each pulse. From the decision point 108, the program enters a decision point 109 to check whether a predetermined number $N_a$ of pulses has been counted for either the front sensor or the rear sensor. If the answer is no, the program branches at NO and returns to the processing function 108 to continue counting pulses from each sensor.

When a predetermined number of pulses has been counted from at least one of the sensors, the program branches from the decision point 109 at YES and enters a decision point 110 to check whether the absolute value of the difference between the pulses counted for the front sensor and the pulses counted for the rear sensor is greater than a second predetermined amount $N_b$, which is less than the amount $N_a$. If this is true, this is an indication that the relative slippage between the front and rear output shafts is greater than a predetermined allowable amount which would occur during normal traction conditions such as during turning of the vehicle. Thus, it is desirable at this time to enter a portion of the program which generates a clutch engagement signal to engage the clutch 29 and lock the planetary gear differential of the transfer case. The program will branch from the decision point 110 at YES and enter a circle labeled "A" at 133 which is continued in FIG. 4b and will be discussed in more detail hereinafter.

In the event the count difference between the front and rear sensor pulses is less than the predetermined amount $N_b$, the program branches from the decision point 110 at NO and enters a decision point 111 to check the number of consecutive times the program has sequenced through the decision points 109 and 110. If this amount does not exceed a predetermined number $N_c$, the program branches at NO and returns to the decision point 107 to then check the sensors before beginning to again count pulses from each sensor.

When the program has executed the decision points 109 and 110 at least $N_c$ consecutive times, the program branches from the decision point 111 at YES and enters a processing function 112 wherein the speeds of both the front and rear shafts are individually calculated. The particular method by which the control determines the speeds of the shafts is shown in more detail in the subroutine of FIG. 4c. Referring now to FIG 4c, the subroutine is initiated at an oval 113 labeled "DETERMINE SHAFT SPEEDS" and then enters a processing function 114 wherein the microcomputer takes a speed sample from the rear speed sensor by measuring the time period between successive pulses from the rear sensor. Preferably, this time period is measured either between the leading edges of successive pulses, or between the trailing edges thereof. After the initial speed sample has been taken, the program enters a decision point 115 to check whether or not the rear output shaft is actually moving. If the rear output shaft is not moving, the program branches at NO and enters a processing function 116 to determine the speed of the front output shaft. If the rear shaft is moving, the program branches from the decision point 115 at YES and enters a processing function 117 to determine the number of speed samples which should be taken in order to calculate the present speed of the rear output shaft.

In accordance with the present invention, the number of samples which are to be taken is determined as a function of the actual vehicle speed. In particular, it has been found desirable to increase the number of speed samples taken as a function of the vehicle speed. In this case, the initial speed sample taken in the processing function 114 is assumed to represent the present vehicle road speed and, based on this initial speed sample, the number of subsequent speed samples to be taken is determined. For example, if the speed of the vehicle is between 5 and 15 miles per hour, the number of speed samples taken can be in the range of 8 to 16 while, if the speed of the vehicle is between 15 and 30 miles per hour, the number of speed samples taken can be approximately 16 to 32.

Once the number of speed samples to be taken has been determined, the program enters a processing function 118 wherein another speed sample is taken by measuring the time period between successive sensor output pulses. Next, the program enters a decision point 119 which again checks to see whether or not the particular shaft is moving. If the shaft is not moving, the program branches at NO to enter the processing function 116. If the shaft is moving, the program branches at YES and enters a decision point 120 to check whether more samples are to be taken. If more samples are to be taken, the program branches at YES and returns to the processing function 118.

If the required number of samples have been taken, the program branches from the decision point 120 at NO and enters a processing function 121 wherein the average of all of the speed samples taken for the particular shaft is calculated. From this point, the program enters a processing function 122 wherein the average calculated in the processing function 121 is temporarily stored in memory for a later slip comparison. From the processing function 122, the program enters the processing function 116, and repeats the above sequence of operations from steps 114 through 122 for determining the speed of the front output shaft. After the speeds have been calculated for both the front and rear output shafts, the program enters an oval 123 and returns to the appropriate portion of the main program shown in FIGS. 4a and 4b.

Referring back to FIG. 4a, once the program has determined the speeds of both the front and rear output shafts in the processing function 112, the program enters a decision point 124 to check whether both of the shafts are stopped. If they are, the program branches at YES and enters the processing function 104 to disengage the clutch prior to returning to the decision point 107. If both of the shafts are not stopped, the program branches at NO and enters a decision point 125 to check to see whether both of the shafts are moving. If only one of the shafts is moving, the program branches at NO and enters the circle 133 labeled "A" which, as previously mentioned, represents the portion of the program in FIG. 4b which initiates the generation of a clutch engagement signal. If the program determines that both shafts are moving, the program branches from the decision point 125 at YES and enters a processing function 126 to determine the actual vehicle road speed. In this instance, it has been found that utilizing the average speed calculation from the slowest moving shaft provides a fairly accurate indication of the actual vehicle road speed.

Once the vehicle road speed has been determined, the program enters a processing function 127 and calculates the difference between the front and rear shaft speeds which have previously been determined in the processing function 112. From the processing function 127, the program enters a decision point 128 to determine whether the front or rear shaft is rotating faster. If the front shaft is rotating faster, the program branches at FRONT to a processing function 129 which checks a front slip threshold table. If the rear shaft is rotating faster, the program branches at REAR to a processing function 130 which checks a rear slip threshold table. Thus, in the preferred embodiment of the inventor, depending on which shaft is rotating faster, the program looks to one of two different slip threshold tables to obtain a predetermined slip threshold. Generally, the slip threshold is defined as the percentage of allowable differential speed between the front and rear output shafts.

Since the front wheels will be moving faster than the rear wheels when turning the vehicle, it has been found that, for a given vehicle road speed, the slip threshold when the front shaft is rotating faster should be larger than if the rear shaft is rotating faster. Also, in addition to varying the slip threshold as a function of whether the front or rear shaft is rotating faster, it has been found the slip threshold should be a function of actual vehicle road speed. Preferably, in both the front and rear slip tables, the slip thresholds decrease with increasing road speed, i.e., the percentage of allowable differential speed decreases with increasing vehicle speed.

It should be noted that, in some applications, it may not be necessary to provide separate front and rear slip tables, and to vary the slip threshold as a function of vehicle road speed. In these applications, the percentage of allowable differential speed can remain constant at all vehicle speeds.

Also, it should be noted that, in some instances, it may be desirable to set an upper vehicle speed limit above which the clutch is not engaged. Since separate slip tables are provided, separate upper speed limits can be set, depending on whether there is front or rear wheel slip.

From the processing functions 129 or 130, the program enters a decision point 131 to determine whether the relative slip between the front and rear shafts, as determined in the processing function 127, exceeds the predetermined slip threshold, as found in either the front or rear slip tables. If the slip threshold has been exceeded, the program branches at YES to the circle 133 wherein the clutch engagement routine of FIG. 4b is initiated. In the event the slip threshold has not been exceeded, the program branches from the decision point 131 at NO and enters a decision point 132 to check whether or not the present vehicle road speed is below a predetermined amount $V_a$. It has been found that for lower vehicle road speeds, it is desirable to utilize the pulse counting technique of steps 108 through 111 in order to detect excessive slippage between the front and rear output shafts. However, in the event the vehicle road speed is above a predetermined amount, it has been found that the average speed readings calculated by the subroutine of FIG. 4c can be used to effectively determine whether excessive slip is occurring.

Referring now to FIG. 4b, the program enters the circle A at 133 (from FIG. 4a) when it is desirable to temporarily engage the clutch to reduce slippage between the front and rear output shafts. Initially, the program enters a processing function 134 wherein, prior to generating a clutch engagement signal, an initial check is made to see whether there is circuit continuity through the clutch coil 42. This check is made by the microcomputer by monitoring the level of the signal on the line 79. In the event there is continuity through the clutch coil, the line 70 in FIG. 3 will be at a positive voltage level which turns on the transistor 74 and maintains the line 79 at a low level near the circuit ground potential. In the event there is discontinuity through the clutch coil, the transistor 74 will be off and the line 79 will be at a predetermined positive polarity near the +V level. In the processing function 134, if the program determines that there is discontinuity through the clutch coil, the program will set an internal flag and save this information until a later point in the program, as will be discussed.

From the processing function 134, the program enters a processing function 135 wherein the failsafe timeout circuit is reset by generating a positive pulse on the line 82 (shown in FIG. 3) which temporarily turns on the transistor 84 and discharges the timing capacitor 89. Once the clutch coil continuity has been checked and the failsafe timeout circuit has been reset, the program enters a processing function 136 to begin generation of the clutch engagement signal by supplying a high level signal on the line 67 to turn on the transistor 68 and enable current flow through the clutch coil 42 to engage the clutch.

After executing the necessary instructions to generate the clutch engagement signal, the program enters a decision point 137 wherein the microcomputer checks the level of the signal on the line 67 to ensure that a high level clutch engagement signal has been generated. In the event a high level signal is not present on the line 67, the program branches at NO and returns to the beginning of the decision point 137 to continue to check whether or not a high level signal is present. When the high level signal is present on the line 67, the clutch program enters a decision point 138 to determine whether or not clutch coil discontinuity has previously been detected in the processing function 134. In the event there is a problem noted with the continuity of the clutch coil, the program branches from the decision point 138 at NO and enters a processing function 139 wherein the self test routine is initiated to determine and indicate a clutch problem.

In the event a continuity problem has not been previously detected during the processing function 134, the program branches from the decision point 138 at YES and enters a processing function 141 wherein the full clutch engagement signal continues to be generated on the line 67 for a predetermined time period $T_a$. The time period $T_a$ can be a function of vehicle road speed, and typically decreases with increasing road speed. During this time period, the transistor 68 is maintained in a fully ON state such that maximum current is supplied to the clutch coil to maintain the clutch in a fully engaged state. After the predetermined time period $T_a$ has expired, the program enters a processing function 142 wherein the subroutine of FIG. 4c is executed to determine the speeds of each shaft. At this time, since the clutch is fully engaged, the speeds of each shaft should be substantially the same. The program then enters a decision point 143 to determine whether both shafts have stopped. If this is true, there is no need to continue to generate the clutch engagement signal, and the program branches at YES to a circle 144 labeled B from which, in FIG. 4a, the program enters the processing function 104 to generate the clutch disengage signal to the clutch. In the event the front and rear shafts are not stopped, the program branches from the decision point 143 at NO and enters a decision point 145 to check the speed difference between the shafts. In the event the difference in speed is greater than a predetermined amount $S_a$, this indicates that there is a potential mechanical problem with clutch engagement since, at this time, the clutch should be fully engaged and there should be no relative slip between the two shafts. In this instance, the program branches from the decision point 145 at YES and enters the processing function 139 to determine whether a clutch problem exists by executing the self-test routine.

In the event the absolute value of the speed difference between the front and rear output shafts is less than a predetermined amount $S_a$, this indicates that the clutch is fully engaged and the program branches from the decision point 145 at NO and enters a processing function 147 wherein a gradually decreasing engagement signal is generated to the clutch to cause the clutch to gradually move from a fully engaged condition to a partially engaged condition, and then to a fully disengaged condition. This gradually decreasing engagement signal is generated over a time period $T_b$, which is approximately equal to the time period $T_a$ in the processing function 141. The partially engaged clutch signal can be generated by producing a pulsed output signal on the line 67 having a duty cycle which gradually decreases from a 98% level to a 2% level during the time period $T_b$. At the end of the time period $T_b$, the voltage level on the line 67 will be at a low level such that the clutch is fully disengaged. From the processing function 147, the program enters a decision point 148 to check whether the vehicle speed is below the predetermined amount $V_a$. If this is true, it indicates that vehicle speed is in the low speed range and thus it is desirable to use the pulse counting technique of steps 108 to 111 to detect excessive slippage. The program branches from the decision point 148 at YES to a circle 149 labeled "C" which causes the program to enter the decision point 107 of FIG. 4a. In the event the vehicle speed is above the predetermined amount $V_a$, the program branches from the decision point 148 at NO and enters a circle 150 labeled "D", which causes the program to branch to FIG. 4a and enter the processing function 112, wherein the front and rear shaft speeds are calculated and compared.

The present invention has been illustrated and described in its preferred embodiment. However, it will be appreciated that the above described embodiment of the electronic control be modified without departing from the scope of the attached claims. For example, while the above discussed control is utilized to selectively control the engagement of an electro-magnetic clutch, it will be appreciated that the electro-magnetic clutch can be replaced with either a hydraulically or other fluid actuated clutch which in turn can be controlled by electrically actuated solenoid valves.

What is claimed is:

1. A method for controlling a torque transfer unit having a driven input shaft coupled to divide torque between first and second output shafts, the transfer unit including a selectively engageable clutch means responsive to an engagement signal for interconnecting said first and second shafts to prevent slip therebetween, said method comprising the steps of:
    (a) generating a first pulsed output signal wherein each pulse of said first pulsed signal represents a predetermined amount of rotation of the first output shaft;
    (b) generating a second pulsed output signal wherein each pulse of said second pulsed signal represents a predetermined amount of rotation of the second output shaft;
    (c) counting the number of output pulses generated in step (a) to obtain a first pulse count;
    (d) simultaneously with step (c), counting the number of output pulses generated in step (b) to obtain a second pulse count;
    (e) discontinuing the counting in steps (c) and (d) in response to a first predetermined number of output pulses having been counted;
    (f) subsequent to step (e), comparing the first and second pulse counts obtained in steps (c) and (d) to obtain a count difference; and
    (g) generating a clutch engagement signal if the count difference obtained in step (f) is equal to or greater than a second predetermined number less than said first predetermined number.

2. The method according to claim 1 wherein step (e) is performed when at least one of said first and second pulse counts reaches said first predetermined number.

3. The method according to claim 1 wherein, in the event the count difference obtained in step (f) is less than said second predetermined number, steps (c) through (f) are repeated until said count difference is equal to or greater than said second predetermined number.

4. The method according to claim 3 wherein, in the event the count difference obtained in step (f) continues to be less than said second predetermined number after steps (c) through (f) have been performed for a third predetermined number of times, the following steps are performed:
    (h) determining a first output shaft speed from the first pulsed output signal;
    (i) determining a second output shaft speed from the second pulsed output signal;
    (j) comparing the first and second output shaft speeds obtained in steps (h) and (i) to obtain a speed difference; and
    (k) generating a clutch engagement signal if the speed difference obtained in step (j) exceeds a predetermined slip threshold.

5. The method according to claim 4 wherein the torque transfer case is used in a vehicle four-wheel drive system wherein the first output shaft is coupled to drive the vehicle front wheels and the second output shaft is coupled to drive the vehicle rear wheels, and said method includes the step of determining a road speed value representing the vehicle road speed.

6. The method according to claim 5 wherein said road speed value is equal to the smaller one of the first and second output shaft speeds obtained in steps (h) and (i).

7. The method according to claim 5 wherein, in the event the speed difference obtained in step (j) is less than the predetermined slip threshold, and the road speed value is above a predetermined speed, steps (h) through (j) are repeated.

8. The method according to claim 5 wherein, in the event the speed difference obtained in step (j) is less than the predetermined slip threshold, and the road speed value is below the predetermined speed, steps (c) through (f) are repeated.

9. The method according to claim 5 including, prior to step (k), the step of determining the slip threshold as a function of the road speed value.

10. The method according to claim 9 wherein the slip threshold decreases with increasing vehicle road speed.

11. The method according to claim 5 including, prior to step (k), the step of determining the slip threshold as a function of whether the first output shaft speed is greater than the second output shaft speed.

12. The method according to claim 11 wherein the slip threshold is larger when the first output shaft speed is greater than the second output shaft speed.

13. The method according to claim 5 wherein step (k) includes the step of generating the clutch engagement signal for a predetermined time period.

14. The method according to claim 13 wherein said predetermined time period is a function of the road speed value.

15. The method according the claim 14 wherein said time period decreases with increasing road speed.

16. A method for controlling a four-wheel drive system for a vehicle including a torque transfer unit having a driven input shaft coupled to divide torque between front and rear output shafts coupled to drive the front and rear wheels of the vehicle respectively, the transfer unit including a selectively engageable clutch means responsive to an engagement signal for interconnecting said first and second output shafts to prevent relative slip therebetween, said method comprising the steps of:
(a) monitoring the relative sliP' between the front and rear output shafts;
(b) generating a clutch engagement signal if the relative slip obtained in step (a) exceeds a predetermined slip threshold, said clutch engagement signal including a first portion generated for a first predetermined time period for maintaining said clutch means in a full engagement state and a second portion generated for a second predetermined time period immediately following said first predetermined time period for maintaining said clutch means in a partially engaged state.

17. The method according to claim 16 wherein said second portion of said clutch engagement signal is generated to cause said clutch means to gradually move from the fully engaged state at the end of said first time period to a fully disengaged state at the end of said second time period.

18. A method for controlling a four-wheel drive system for a vehicle including a torque transfer unit having a driven input shaft coupled to divide torque between front and rear output shafts coupled to drive the front and rear wheels of the vehicle respectively, the transfer unit including a selectively engageable clutch means responsive to an engagement signal for interconnecting said first and second output shafts to prevent relative slip therebetween, said method comprising the steps of:
(a) monitoring the relative slip between the front and rear output shafts;
(b) determining a road speed value representing the vehicle road speed;
(c) generating a clutch engagement signal for a predetermined time period if the relative slip obtained in step (a) exceeds a predetermined slip threshold, said predetermined time period being a function of the road speed value of step (b).

19. The method according to claim 18 wherein said predetermined time period decreases with increasing vehicle road speed.

20. A method for controlling a four-wheel drive system for a vehicle including a torque transfer unit having a driven input shaft coupled to divide torque between front and rear output shafts coupled to drive the front and rear wheels of the vehicle respectively, the transfer unit including a selectively engageable clutch means responsive to an engagement signal for interconnecting said first and second output shafts to prevent relative slip therebetween, said method comprising the steps of:
(a) monitoring the relative slip between the front and rear output shafts;
(b) determining a road speed value representing the vehicle road speed;
(c) determining a slip threshold as a function of the road speed value determined in step (b); and
(d) generating a clutch engagement signal if the relative slip obtained in step (a) exceeds the slip threshold of step (c).

21. The method according to claim 20 wherein said slip threshold decreases with increasing vehicle road speed.

22. A method for controlling a four-wheel drive system for a vehicle including a torque transfer unit having a driven input shaft coupled to divide torque between front and rear output shafts coupled to drive the front and rear wheels of the vehicle respectively, the transfer unit including a selectively engageable clutch means responsive to an engagement signal for interconnecting said first and second output shafts to prevent relative slip therebetween, said method comprising the steps of:
(a) determining a front output shaft speed;
(b) determining a rear output shaft speed;
(c) comparing the front and rear output shaft speeds of steps (a) and (b) to obtain a speed difference;
(d) determining a slip threshold as a function of whether the front output shaft speed is greater than the rear output shaft speed; and
(e) generating a clutch engagement signal if the speed difference obtained in step (c) exceeds the slip threshold of step (d).

23. The method according to claim 22 wherein said slip threshold is larger when said front output shaft speed is larger than said rear output shaft speed.

24. An electronic control for a vehicle four-wheel drive system including a torque transfer unit having a driven input shaft coupled to divide torque between front and rear output shafts, the transfer unit including a selectively engageable clutch means responsive to an engagement signal for interconnecting said front and rear output shafts to prevent relative slip therebetween, said control comprising:
actuating means for generating a clutch engagement signal for a first predetermined time period when the relative slip between front and rear output shafts exceeds a predetermined slip threshold;
failsafe timeout means for preventing said clutch engagement signal from being supplied to said clutch means after a second predetermined time period following the expiration of said first time period.

25. An electronic control for a vehicle four-wheel drive system including a torque transfer unit having a driven input shaft coupled to divide torque between first and second output shafts, the transfer unit including a selectively engageable clutch means responsive to an engagement signal for interconnecting said first and second output shafts to prevent relative slip therebetween, said control comprising:
first speed sensing means for generating a first pulsed speed signal representing the speed of the first output shaft, said first speed sensing means including a first Hall effect device positioned adjacent an annular toothed member secured to the first output shaft;
second speed sensing means for generating a second pulsed speed signal representing the speed of the second output shaft, said second speed sensing means including a second Hall effect device adjacent an annular toothed member secured to the second output shaft;
control means for comparing said first and second pulsed speed signals to determine whether an excessive slip condition has occurred, said control means operable to generate a clutch engagement signal to engage the clutch when an excessive slip condition has been detected.

26. The control according to claim 25 wherein said control means is remotely located relative to said first speed sensing means, including wire means for connecting said first speed sensing means to said control means, and a resistor means internal to said first speed sensing means connected between selected terminals of said first Hall effect device to enable said control means to check the continuity of said wire means up to said first speed sensing means.

27. A method for controlling a four-wheel drive system for a vehicle including a torque transfer unit having a driven input shaft coupled to divide torque between front and rear output shafts coupled to drive the front and rear wheels of the vehicle respectively, the transfer unit including a selectively engageable clutch means responsive to an engagement signal for interconnecting said first and second output shafts to prevent relative slip therebetween, said method comprising the steps of:

(a) generating a first pulsed output signal wherein each pulse represents a predetermined amount of rotation of said first output shaft;
(b) taking an initial speed sample by measuring the time between successive pulses of said first pulsed output signal to determine an initial speed value;
(c) determining the number of speed samples to be taken as a function of the initial speed value;
(d) taking additional speed samples as required by step (c);
(e) calculating the average of said speed samples to determine an average first output shaft speed;
(f) determining a second output shaft speed;
(g) comparing the first and second output shaft speeds of steps (a) and (b) to obtain a speed difference; and
(h) generating a clutch engagement signal if the speed difference obtained in steP' (g) exceeds a predetermined slip threshold.

* * * * *

UNITED STATES PATENT AND TRADEMARK OFFICE
CERTIFICATE OF CORRECTION

PATENT NO. : 4,937,750

DATED : June 26, 1990

INVENTOR(S) : Bradley T. Gilliam

It is certified that error appears in the above-identified patent and that said Letters Patent is hereby corrected as shown below:

Claim 1, line 48, after "prevent" add -- relative --.

Claim 16, line 12, after "relative" change "sliP'" to -- slip --.

Claim 27, column 2, line 17, after "in" change "steP'" to -- step --.

Signed and Sealed this

Eighteenth Day of February, 1992

Attest:

HARRY F. MANBECK, JR.

*Attesting Officer*  *Commissioner of Patents and Trademarks*